(No Model.)
R. HERRING, Jr.
SWIVEL FOR FISHING LINES.
No. 473,503. Patented Apr. 26, 1892.
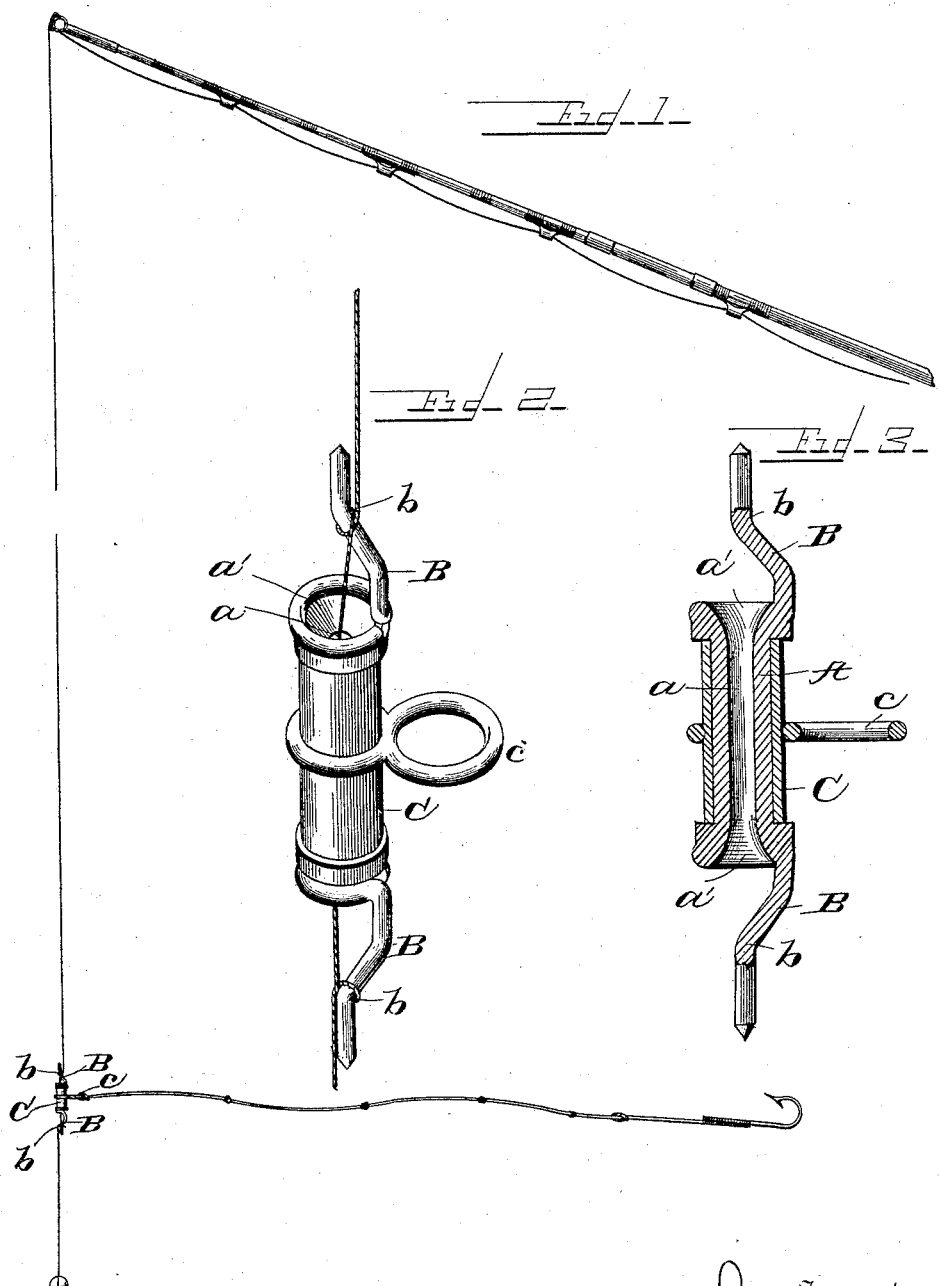

UNITED STATES PATENT OFFICE.

RUDOLPH HERRING, JR., OF BROOKLYN, NEW YORK.

SWIVEL FOR FISHING-LINES.

SPECIFICATION forming part of Letters Patent No. 473,503, dated April 26, 1892.

Application filed May 27, 1891. Serial No. 394,236. (No model.)

*To all whom it may concern:*

Be it known that I, RUDOLPH HERRING, Jr., a citizen of the United States, residing at Brooklyn, in the county of Kings and State of New York, have invented certain new and useful Improvements in Swivels for Fishing-Lines; and I do hereby declare the following to be a full, clear, and exact description of the invention, such as will enable others skilled in the art to which it appertains to make and use the same.

My invention is an improved swivel for fishing-lines; and it consists in the novel features of construction and combination of parts hereinafter fully described.

In the accompanying drawings I have illustrated one form in which I have contemplated embodying my invention, and said invention is fully disclosed in the following description and claims.

Referring to the said drawings, Figure 1 represents a portion of a fishing-pole with line attached, showing my improved swivel applied thereto. Fig. 2 is an enlarged perspective view of my improved swivel. Fig. 3 is an enlarged central longitudinal section of the same.

The object of my invention is to provide a swivel to which the leader can be secured in such a manner that the leader will not be wound around the line and which can be quickly and easily adjusted to different distances from the end of the line without breaking the line or injuring it in any way.

The main body of my improved swivel consists of a central hollow tubular portion A, provided with a central aperture $a$, which is increased in diameter at each end to form the flaring aperture $a'$, thus avoiding rough edges, which would tend to wear the line. The body portion A is provided at one or both ends with a projection or horn B, formed integrally therewith or secured thereto in any desired manner.

I have shown the body A provided with two horns or projections located in the same axial plane; but they need not be in the same plane, and one horn or projection could be used without departing from my invention.

The main tubular body A is surrounded by a loose sleeve, ring, or collar C, which is free to turn about the body A, and is secured from being disengaged therefrom by raised portions or flanges $a^2$ on the body A adjacent to its ends. This sleeve or collar may be of any desired width and is provided with a ring or eye $c$, to which the leader is attached.

In applying the swivel to a line the line is passed through the central aperture and a loop is made in the line and slipped over one or both of the horns B, thus securing the swivel in place on the line, as clearly shown in Fig. 2. The leader is then secured to the ring or eye $c$ in the usual manner. The swivel may be instantly adjusted to any desired position on the line by simply pulling the loops off of the horns B B and making the loops higher up or lower down on the line, as the case may be. The loop referred to herein is the ordinary loop or half-hitch well known to anglers, and is quickly made and unmade without injuring the line.

The swivel will be held in a vertical position when the line is taut, and the bait and leader are thus free to swing about the swivel by means of the loose sleeve or collar without danger of winding up the leader on the line.

I prefer to curve the outer ends of the horns B inward at $b$ into substantially the line of the center of the main body A, as shown in the drawings.

What I claim, and desire to secure by Letters Patent, is—

1. In a swivel, the combination, with the main body having a central aperture for the passage of the line therethrough and provided with a projecting horn adapted to be frictionally engaged by a loop of the line, of a collar revolubly mounted on said main body and provided with an attaching-eye, whereby said swivel may be attached to and adjusted upon a line intermediate its ends without severing said line, substantially as described.

2. In a swivel, the combination, with the main body provided with a central aperture having the flaring end portions and the horns or projections extending longitudinally from said main body, of a collar revolubly mounted on said main body and provided with an attaching-eye, said horns or projections having portions substantially in line with the center of said central aperture, substantially as described.

In testimony whereof I affix my signature in presence of two witnesses.

RUDOLPH HERRING, JR.

Witnesses:
CHAS. WENGENROTH,
M. H. JOHNSON.